(12) United States Patent
Nielson et al.

(10) Patent No.: US 6,814,155 B1
(45) Date of Patent: *Nov. 9, 2004

(54) BOLTING RIGS

(75) Inventors: Brad Nielson, Cordeaux Heights (AU);
John Pointer, Seven Hills (AU);
Gregory S. Wilson, Oil City, PA (US)

(73) Assignee: Joy M M Delaware, Inc., Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/550,035

(22) Filed: Apr. 14, 2000

(51) Int. Cl.⁷ .................................................. B23Q 5/00
(52) U.S. Cl. ........................ 173/152; 173/141; 173/42; 173/11
(58) Field of Search ................................ 173/141, 152, 173/42, 193, 11

(56) References Cited

U.S. PATENT DOCUMENTS

| | | | |
|---|---|---|---|
| 1,980,256 A | | 11/1934 | Curtis |
| 2,840,347 A | | 6/1958 | Feucht |
| 3,710,876 A | * | 1/1973 | Christensen .................... 173/1 |
| 3,744,575 A | * | 7/1973 | Strommes .................... 173/152 |
| 3,754,605 A | * | 8/1973 | Porter et al. ................. 173/152 |
| 3,780,816 A | | 12/1973 | Arrington et al. |
| 4,601,000 A | | 7/1986 | Montabert |
| 5,213,169 A | * | 5/1993 | Heller ......................... 173/185 |
| 5,941,324 A | * | 8/1999 | Bennett .................... 166/77.51 |
| 6,105,684 A | * | 8/2000 | Pointer et al. ............... 173/141 |

* cited by examiner

*Primary Examiner*—Rinaldi I. Rada
*Assistant Examiner*—Gloria R. Weeks
(74) *Attorney, Agent, or Firm*—James Earl Lowe, Jr.

(57) ABSTRACT

The invention provides a bolting installation apparatus comprising a base having a pair of parallel cylindrical rods held between two end plates; an intermediate carriage slidably mounted on said rods; a drilling unit carriage having at least one first rod and at least one second rod spaced apart from said first rod; a drilling unit slidably mounted on said second rod and said intermediate carriage slidably receiving said first rod of said drilling unit carriage; at least one moving means to move each of said base, said intermediate carriage and said drilling unit carriage relative to each other.

7 Claims, 6 Drawing Sheets

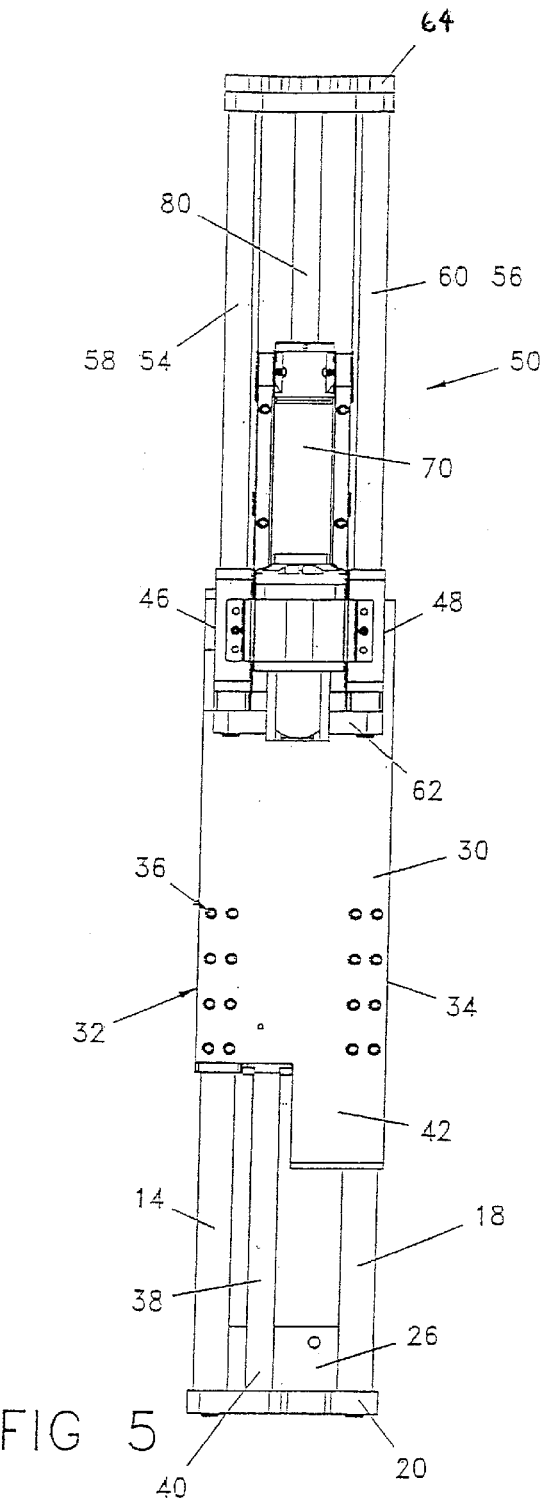
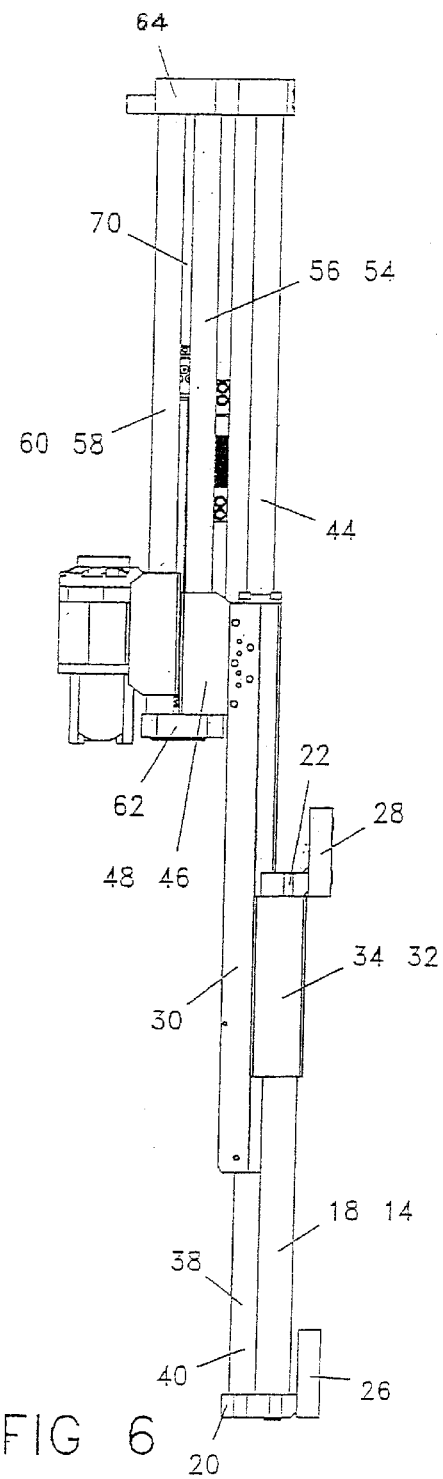

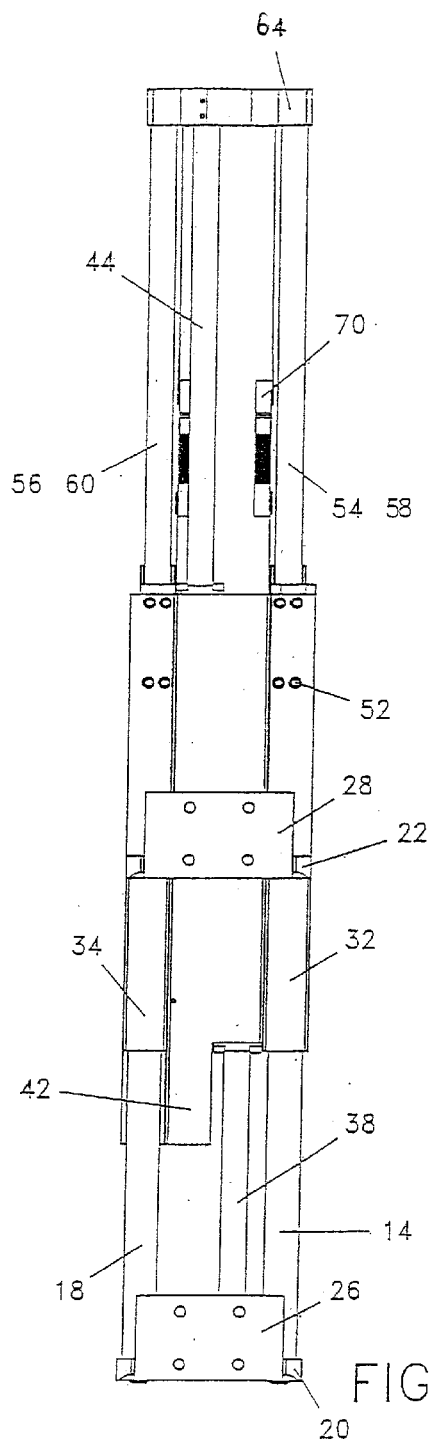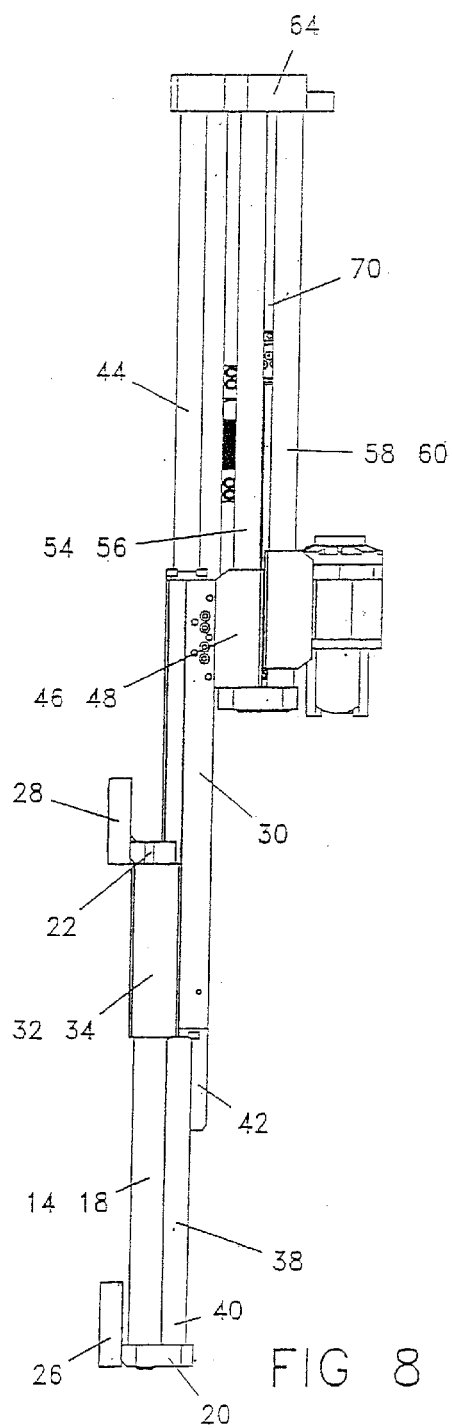

BOLTING RIGS

FIELD OF THE INVETION

The present invention relates to bolting rigs for use in mining operations and the like.

BACKGROUND OF THE INVENTION

Prior art bolting apparatus such as that described in Australian patent application 34200/97 published on Feb. 12, 1998 have several disadvantages. They have a retracted height which in some circumstances will prevent their use in low roof height mining operations. Further the feed frame of the bolting apparatus includes a complex cylinder arrangement for moving both the feed frame and rotational unit.

SUMMARY OF THE INVENTION

The present invention provides a bolting installation apparatus comprising (a) a base having a pair of parallel cylindrical rods held between two end plates;

(b) an intermediate carriage slidably mounted on said rods;

(c) a drilling unit carriage having at least one first rod and at least one second rod spaced apart from said first rod;

(d) a drilling unit slidably mounted on said second rod and said intermediate carriage slidably receiving said first rod of said drilling unit carriage;

(e) at least one moving means to move each of said base, said intermediate carriage and said drilling unit carriage relative to each other.

The moving means can be located on or in said intermediate carriage and is preferably two oppositely directed cylinders formed in or mounted on said intermediate carriage, each cylinder having slidably mounted therein a piston to engage respectively said base and said drilling unit carriage.

The intermediate carriage can include two sleeves on one end and on one side of said intermediate carriage to receive said pair of parallel cylindrical rods of said base.

Preferably intermediate carriage includes at least one drilling unit carriage sleeve on the other end and other side of said intermediate carriage from the location of said base sleeves to receive said at least one first rod of said drilling unit carriage.

The drilling unit carriage can have two first rods and two second rods with said two first rods being slidably received by two respective drilling unit carriage sleeves on said intermediate carriage. Preferably the drilling unit carriage includes motive power means to slide said drilling unit along said at least one second rod.

BRIEF DESCRIPTION OF THE DRAWINGS

An embodiment of the present invention will now be described by way of example only with reference to the accompanying drawings in which:

FIG. 5 is a front elevation of the apparatus of FIG. 1.

FIG. 6 is a right side view of the apparatus of FIG. 1.

FIG. 7 is a new elevation of the apparatus of FIG. 1.

FIG. 8 is a left side view of the apparatus of FIG. 1.

Figure 1:
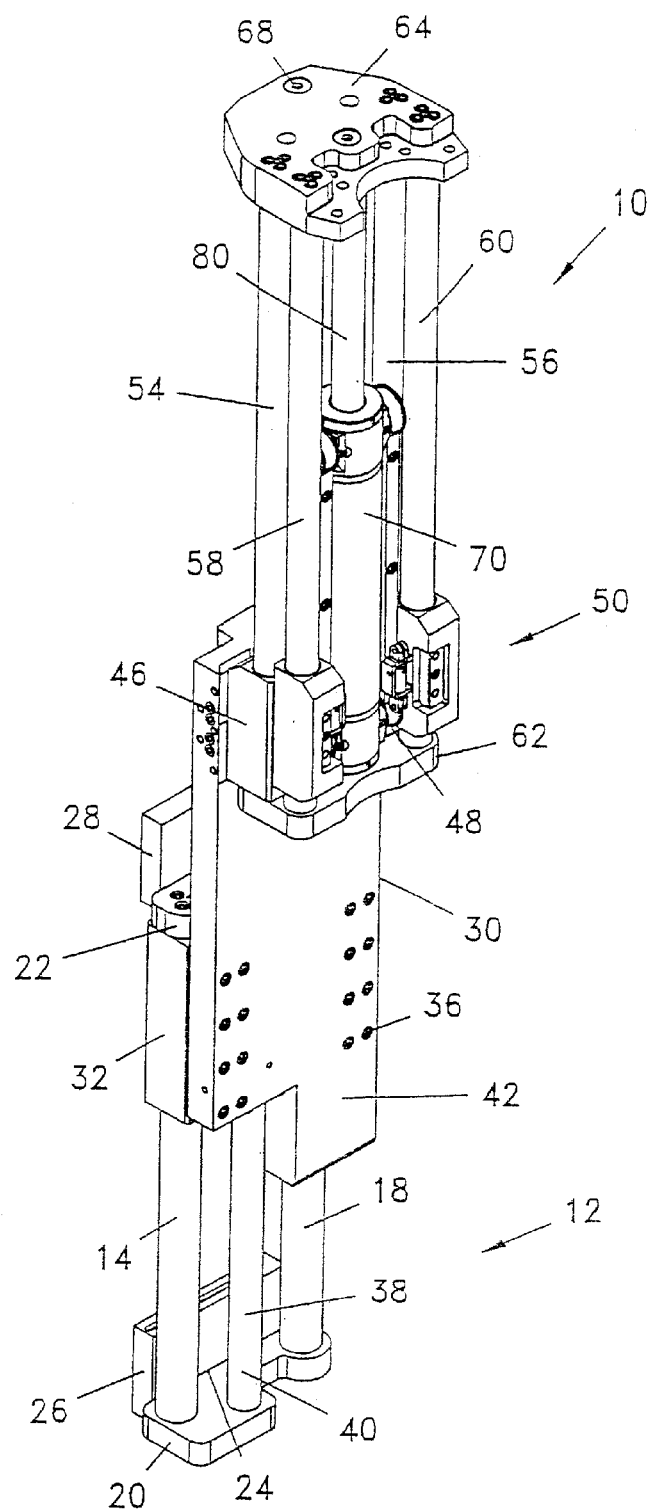
FIG. 1 is a perspective view of a bolting apparatus in a fully extended configuration with rotation unit removed.
Figure 2:
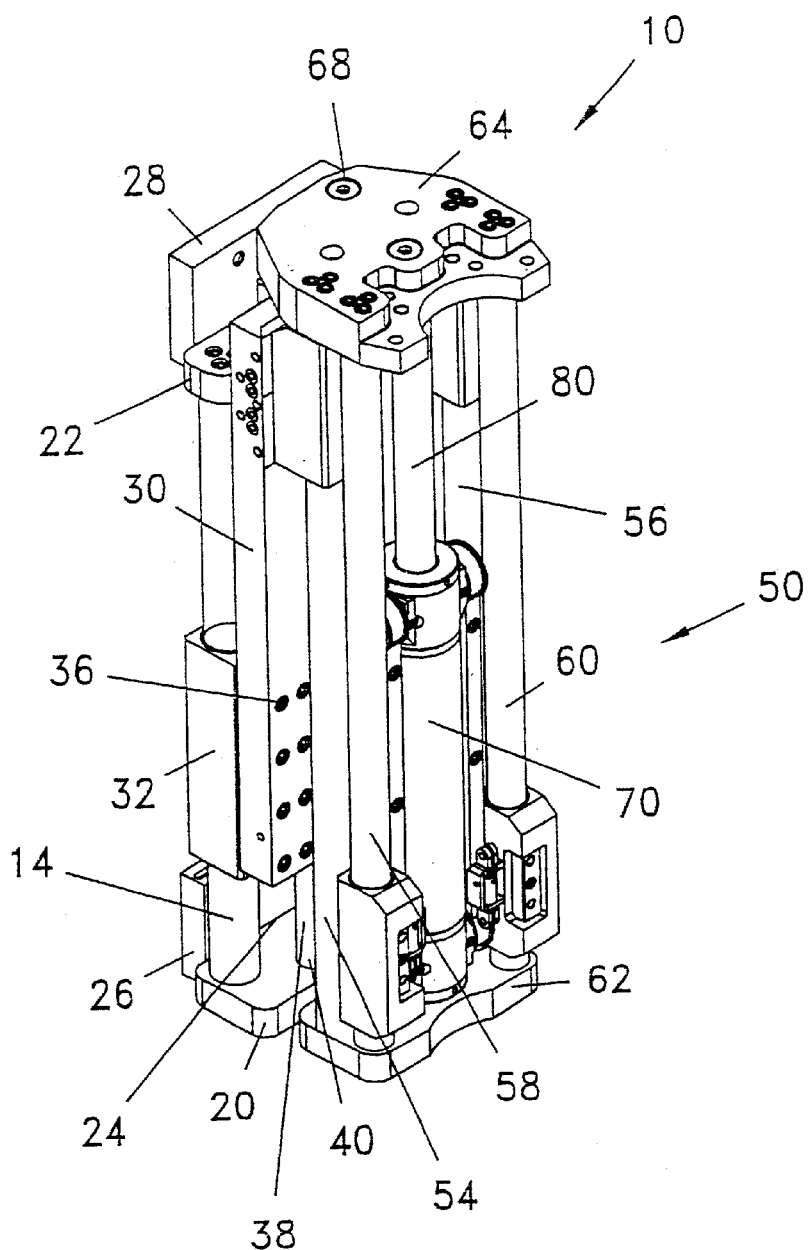
FIG. 2 is a perspective view of a bolting apparatus in a collapsed configuration with rotation unit removed.
Figure 3:
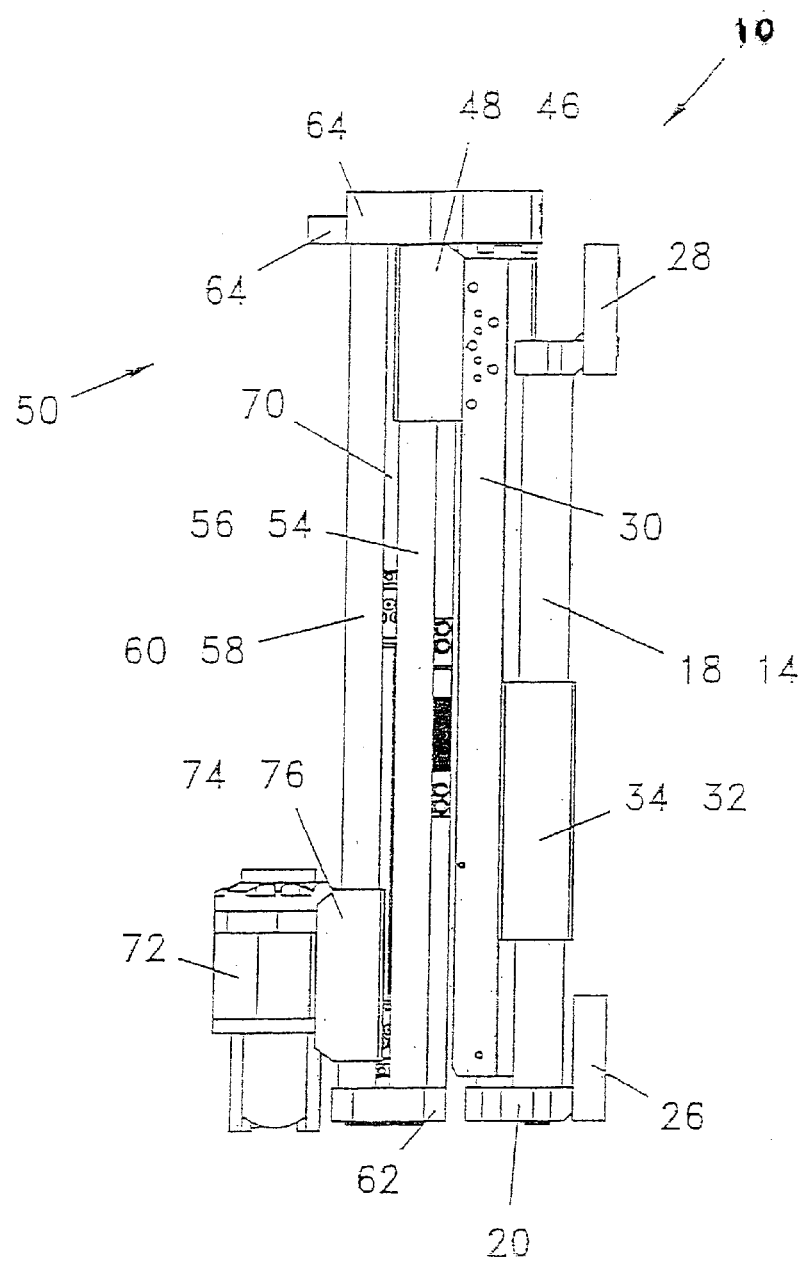
FIG. 3 is a right side elevation of apparatus of FIG. 2 with rotational unit attached.

Before one embodiment of the invention is explained in detail, it is to be understood that the invention is not limited in its application to the details of the construction and the arrangements of components set forth in the following description or illustrated in the drawings. The invention is capable of other embodiments and of being practiced or being carried out in various ways. Also, it is to be understood that the phraseology and terminology used herein is for the purpose of description and should not be regarded as limiting. Use of "including" and "comprising" and variations thereof as used herein is meant to encompass the items listed thereafter and equivalents thereof as well as additional items. Use of "consisting of" and variations thereof as used herein is meant to encompass only the items listed thereafter and equivalents thereof.

DETAILED DESCRIPTION OF THE EMBODIMENTS

As illustrated in FIGS. 1 to 8 the bolting apparatus 10 has a base 12 which is formed from a pair of cylindrical rods 14 and 18 which are held in parallel between a lower end plate 20 and an upper end plate 22.

The lower end plate 20 has a generally L shaped configuration. The longest side 24 of lower end plate 20 has attached to it a mounting plate 26. The upper end plate 22 similarly has attached to it a mounting plate 28. The mounting plates 26 and 28 permit the attachment of the base 12 and thus the bolting apparatus 10 to a bolting or mining machine.

A base carriage 30 has a left side sleeve block 32 and a right side sleeve block 34 which slidably receive the rods 14 and 18 of base 12. Sleeve blocks 32 and 34 are each secured to base carriage 30 preferably via five machine screws 36. However other attachment means such as welding or the like can be used. Alternatively the blocks 32 and 34 can be formed integrally with the base carriage 30.

The sleeve blocks 32 and 34 include a bore wholly through them which receives rods 14 and 18. At or near to the openings of each bore, there is positioned a rod wiper and sliding seal means (not illustrated) to clean and wipe the rods 14 and 18 as the rods 14 and 18 pass into the sleeve blocks 32 and 34.

The base carriage 30 includes an internal hydraulic cylinder (not visible) from which a piston 38 extends. The distal end 40 of piston 38 is attached to lower end plate 20. The internal hydraulic cylinder and piston 38 are preferably dual powered. That is hydraulic pressure causes the extension of piston 38 out of the cylinder and with appropriate valve operation the retraction of piston 38 into the cylinder. By this mechanism the cylinder and piston 38 causes the base carriage 30 to slide along the rods 14 and 18 in both the extension and retraction directions.

The base carriage 30 includes an extended portion 42 to house another internally located hydraulic cylinder to slidably receive a piston 44 (FIGS. 6, 7, 8) so that when the hydraulic cylinder is pressurized, a drill carriage or feed frame 50 will move relative to the base carriage 30.

To achieve this relative movement the base carriage 30 includes (on its other end and other side to the location of sleeve blocks 32 and 34) a left side sleeve block 46 and a right side sleeve block 48.

The sleeve blocks 46 and 48 are constructed similarly to sleeve blocks 32 and 34 with a bore through each and associated rod wipers and sliding seals.

The blocks 46 and 48 are each attached to the base carriage 30 by means of four machine screws 52 (see FIG. 7), however they can be attached by any means or formed integrally therewith.

The sleeve blocks 46 and 48 receive a pair of rods 54 and 56 respectively. The rods 54 and 56 are a first pair of rods of the feed frame 50.

The feed frame 50 is formed from this first pair of rods 54 and 56 and a second pair of rods 58 and 60. The rods 54, 56, 58 and 60 are held in parallel by a lower end plate 62 and an upper end plate 64.

Figure 4:
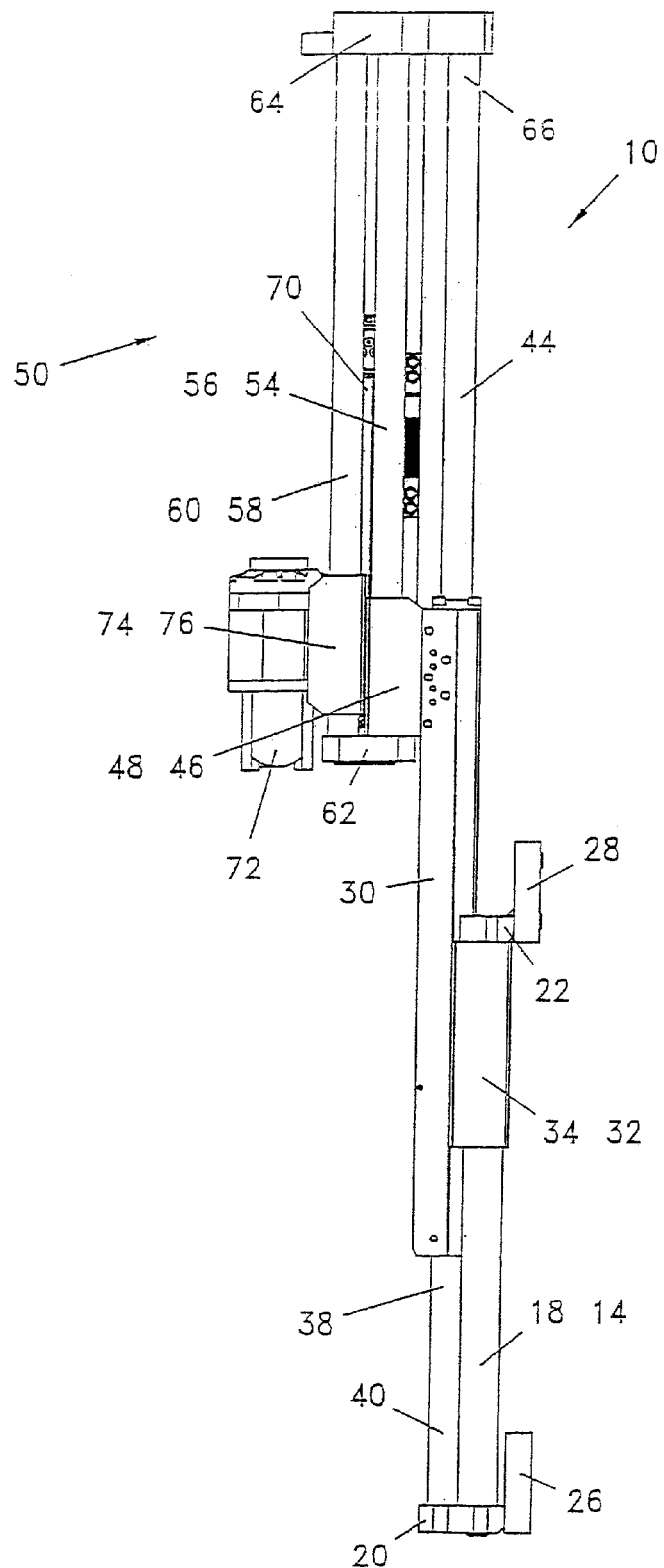
FIG. 4 is a right side elevation of apparatus of FIG. 1 with rotational unit attached.

The piston 44 of FIGS. 4 to 6 has its distal end 66 attached to upper end plate 64 by means of a machine screw 68. Thus when piston 44 is extended from or retracted into the cylinder in the base carriage 30, the feed frame 50 will slide relative to the slide blocks 46 and 48.

The feed frame 50 is constructed with a stationary piston 80 secured to both the lower end plate 62 and upper end plate 64. The piston 80 is received by movable cylinder 70 and in a manner similar to that described in 34200/97 by means of a chain or steel cable arrangement will slide the rotation or drilling unit 72 which is mounted on sleeve blocks 74 and 76 (see only FIGS. 3 & 4, as in other figure items 72, 74 and 76 are removed for clarity purposes) which receive the second pair of rods 58 and 60.

Preferably all sleeve blocks in the embodiment described above include rod wipers and sliding seals at each end of the bore passing through the sleeve block so as to protect the mating surfaces of the rods and sleeve blocks.

It will be understood that the invention disclosed and defined herein extends to all alternative combinations of two or more of the individual features mentioned or evident from the text or drawings. All of these different combinations constitute various alternative aspects of the invention.

The foregoing describes embodiments of the present invention and modifications, obvious to those skilled in the art, can be made thereto without departing from the scope of the present invention.

What is claimed is:

1. A bolting installation apparatus comprising:
    a base having a pair of parallel cylindrical rods held between two end plates;
    an intermediate carriage slidably mounted on said rods;
    a drilling unit carriage having at least one first rod and at least one second rod spaced apart from said first rod;
    a drilling unit slidably mounted on said second rod and said intermediate carriage slidably receiving said first rod of said drilling unit carriage;
    at least one moving means to move each of said base, said intermediate carriage and said drilling unit carriage relative to each other.

2. A bolting installation apparatus as claimed in claim 1, wherein said moving means is located on or in said intermediate carriage.

3. A bolting installation apparatus as claimed in claim 1, wherein said moving means is two oppositely directed cylinders formed in or mounted on said intermediate carriage, each cylinder having slidably mounted therein a piston to engage respectively said base and said drilling unit carriage.

4. A bolting installation apparatus as claimed in claim 1, wherein said intermediate carriage includes two sleeves on one end and on one side of said intermediate carriage to receive said pair of parallel cylindrical rods of said base.

5. A bolting installation apparatus as claimed in claim 4 wherein said intermediate carriage includes at least one drilling unit carriage sleeve on the other end and other side of said intermediate carriage from the location of said base sleeves to receive said at least one first rod of said drilling unit carriage.

6. A bolting installation apparatus as claimed in claim 1 wherein said drilling unit carriage has two first rods and two second rods with said two first rods being slidably received by two respective drilling unit carriage sleeves on said intermediate carriage.

7. A bolting installation apparatus as claimed in claim 1 wherein said drilling unit carriage includes motive power means to slide said drilling unit along said at least one second rod.

* * * * *